UNITED STATES PATENT OFFICE.

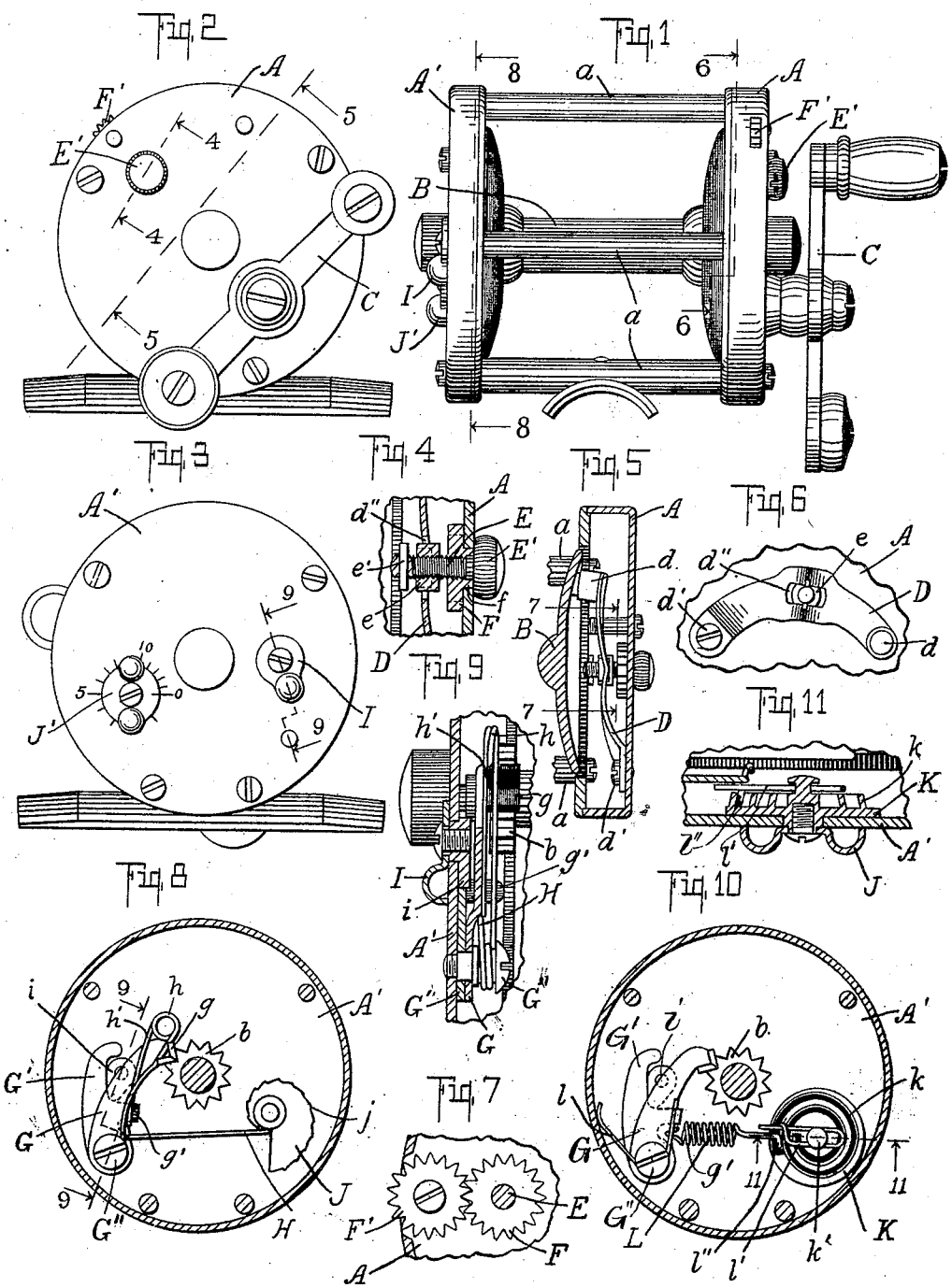

WALTER E. MARHOFF, OF KALAMAZOO, MICHIGAN, ASSIGNOR TO MARHOFF REEL CO., OF KALAMAZOO, MICHIGAN, A CORPORATION.

FISH-LINE REEL.

No. 840,948.     Specification of Letters Patent.     Patented Jan. 8, 1907.

Application filed March 19, 1906. Serial No. 306,839.

*To all whom it may concern:*

Be it known that I, WALTER E. MARHOFF, a citizen of the United States, residing at Kalamazoo, in the county of Kalamazoo, State of Michigan, have invented certain new and useful Improvements in Fish-Line Reels, of which the following is a specification.

This invention relates to improvements in fish-line reels.

The objects of this invention are, first, to provide in a fish-line reel an improved click mechanism which may be adjusted to regulate its tension; second, to provide in a fish-line reel an improved click mechanism which operates freely and smoothly with the reel running in either direction; third, to provide in a fish-line reel an improved click mechanism having few parts, which parts are economical to produce and easily assembled; fourth, to provide in a fish-line reel an improved brake mechanism which is capable of very accurate and delicate adjustment; fifth, to provide in a fish-line reel an improved drag mechanism which is very simple and economical in structure and not likely to become disarranged.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is a side elevation of a structure embodying the features of my invention. Fig. 2 is an end elevation looking from the right of Fig. 1. Fig. 3 is an end elevation looking from the left of Fig. 1. Fig. 4 is an enlarged detail section taken on a line corresponding to line 4 4 of Fig. 2, the screw E and its finger-piece being shown in full lines. Fig. 5 is a detail transverse section through the head A, taken on a line corresponding to line 5 5 of Fig. 2, showing structural details and arrangement of the brake mechanism. Fig. 6 is a detail view of the drag mechanism, taken on a line corresponding to the broken line 6 6 of Fig. 1. Fig. 7 is an enlarged detail section, taken on a line corresponding to line 7 7 of Fig. 5, showing the details of the brake-operating means. Fig. 8 is a transverse section through the head A', taken on a line corresponding to line 8 8 of Fig. 1, showing structural details and arrangement of the parts of the click mechanism. Fig. 9 is an enlarged detail section taken on a line corresponding to the broken line 9 9 of Fig. 8. Fig. 10 is a view, corresponding to the view shown in Fig. 8, of a modified construction of the spring and its adjusting means for the click mechanism. Fig. 11 is an enlarged detail section taken on a line corresponding to line 11 11 of Fig. 10.

In the drawings the sectional views are taken looking in the direction of the little arrows at the ends of the section-lines, and similar letters of reference refer to similar parts throughout the several views.

Referring to the drawings, the heads A A' are connected by suitable pillars $a$, arranged in the usual well-known manner. The heads A A' serve as supports and housings for the click and brake mechanism and the driving-gear for the spool B. C is the crank. My improved brake mechanism is arranged within the head A. This brake consists of a spring-arm D, secured at one end to the frame or head by a suitable screw, as $d'$. On the other end of the spring is a friction-shoe $d$, arranged so that it may be thrown into contact with the head of the spool B. The spring is adjusted by means of the screw E. On this screw is threaded the block $e$, which is arranged in a suitable slot $d''$ in the spring D. This prevents the turning of the block. Through the inner end of the screw is a pin $e'$. The screw E is manipulated by means of its knurled finger-piece E' on its outer end or by means of the toothed finger-wheel F', the edge of which is arranged so that it projects through the periphery of the head A. (See Fig. 1.) This pinion F' is arranged to mesh with the pinion F on the screw E. The pinion F is provided with a hub $f$, arranged in a suitable bearing formed in the head A. (See Fig. 4.) By thus arranging the parts the screw E may be adjusted either from the periphery or from the face of the head, it being sometimes desirable to use one and sometimes the other.

The structure and arrangement of my improved brake is such that it is capable of very accurate and delicate adjustment, it being evident that the same may be adjusted to apply just the required tension to the brake.

My improved click is arranged in the head A' and consists of the pivoted lever G, having a V-shaped engaging member $g$ thereon for engaging the click-pinion which is provided on the shaft of the spool. This V-shaped engaging member $g$ is arranged in such relation to the pivot-pin of the lever and the click-pinion $b$ that it lies in a radial line of the click-pinion. Tension is applied to the click-lever G by means of the spring H, one end of which engages the click $g$ and the other end of which is held by the cam J. The spring being fulcrumed upon the pivot G'' for the click-lever tends to normally hold the same in engagement with the pinion. The end of the spring H rests upon the cam J, so that by adjusting the cam the tension of the spring is regulated. The cam is provided with a plurality of teeth in which the spring engages as the cam is adjusted. The cam J is mounted upon the stem of the finger-piece or button J'. (See Fig. 3.) This button is provided with a scale, as is indicated in Fig. 3, so that the position of the cam, and therefore the tension of the click, can be readily determined. The click is thrown out of engagement by means of the cam $i$, which is arranged to engage the lever G'. This lever is provided with a lug or finger $g'$, which engages under the click-lever G, so that when the lever G' is thrown outwardly by means of the cam $i$ the click is lifted from the pinion. Tension is applied to this lever G' by means of the extension $h'$ on the spring. This spring is formed by coiling the spring H, as at $h$, the coil being located beyond the point of engagement with the click. The free end of this spring engages over the lug or finger $g'$, which holds the lever G' in contact with the cam $i$, preventing rattling of the parts when the click is in operation. The lever G' is pivoted on the pivot G'', by which the click-lever G is carried. The cam $i$ is manipulated by the finger-button I. (See Figs. 3 and 9.) It is evident that my improved click can be adjusted to secure any desired friction, so that the same may be used as an alarm or as a brake, as desired. The same may be adjusted from one to the other readily, it only being necessary to rotate the cam J forwardly.

In the modified construction shown in Figs. 10 and 11 the coiled spring L is substituted for the spring H of Figs. 8 and 9. This coiled spring is secured at one end to the click-lever G and the other end is secured to the disk K, by which its tension may be adjusted. This disk is provided with a convolute threaded rib $k$ on its face, with which the spring L is engaged. To accomplish this in a simple manner, I form an engaging finger $l''$ by looping the same. (See Figs. 10 and 11.) This spring is held in engagement with the rib $k$ by the loop extension $l''$, which is engaged over a suitable head formed on the disk, as clearly appears in Figs. 10 and 11. In this modified construction tension is applied to the lever G' by means of the spring L, one end of which is arranged to engage the lug or finger $g'$ thereon and the other to engage the wall of the head, as clearly appears from Fig. 10 of the drawings. While this structure is entirely practical, I prefer that illustrated in detail in Figs. 8 and 9 as being more economical to produce and easier to adjust, it only being necessary to turn the same in one direction to secure high or low tension.

I have illustrated and described my improvements in detail in the form preferred by me on account of structural simplicity and economy in manufacturing. I am, however, aware that they are capable of considerable variation in structural details without departing from my invention.

Having thus described my invention, what I claim as new, and desire to secure by Letters Patent, is—

1. In a fishing-reel, the combination of a frame; a click-pinion; a lever having a click or detent thereon; a pivot on which said lever is mounted; an adjusting-lever having a finger arranged to engage the under side of said click-lever, mounted on the said pivot; means for holding said adjusting-lever outwardly, provided with a suitable finger-piece; a spring fulcrumed about said pivot, arranged with one end resting on said click or detent and having a coil therein beyond said click, with an extension arranged to engage said lug or finger on said adjusting-lever; a cam having a notched or toothed periphery on which the said tension-spring rests; a finger-piece for adjusting said cam; and a scale for said finger-piece, for the purpose specified.

2. In a fishing-reel, the combination of a frame; a click-pinion; a lever having a click or detent thereon; a pivot on which said lever is mounted; an adjusting-lever having a finger arranged to engage the under side of said click-lever, mounted on the said pivot; means for holding said adjusting-lever outwardly, provided with a suitable finger-piece; a spring fulcrumed about said pivot, arranged with one end resting on said click or detent and having an extension arranged to engage said lug or finger on said adjusting-lever; a cam having a notched or toothed periphery on which the said tension-spring rests, for the purpose specified.

3. In a fishing-reel, the combination of a frame; a click-pinion; a lever having a click or detent thereon; a pivot on which said lever is mounted; an adjusting-lever having a finger arranged to engage the under side of said click-lever, mounted on the said pivot; means for holding said adjusting-lever outwardly provided with a suitable finger-piece; a spring fulcrumed about said pivot, arranged with one end resting on said click or detent and having an extension arranged to engage said lug or finger on said adjusting-lever; a cam on which the said tension-spring rests; a finger-piece for adjusting said cam; and a scale for said finger-piece, for the purpose specified.

4. In a fishing-reel, the combination of a frame; a click-pinion; a lever having a click or detent thereon; a pivot on which said lever is mounted; an adjusting-lever having a finger arranged to engage the under side of said click-lever, mounted on the said pivot; means for holding said adjusting-lever outwardly, provided with a suitable finger-piece; a spring fulcrumed about said pivot, arranged with one end resting on said click or detent and having an extension arranged to engage said lug or finger on said adjusting-lever; a cam on which the said tension-spring rests, for the purpose specified.

5. In a fishing-reel, the combination of a frame; a click-pinion; a lever having a click or detent thereon; a pivot on which said lever is mounted; an adjusting-lever having a finger arranged to engage the under side of said click-lever, mounted on the said pivot; means for holding said adjusting-lever outwardly, provided with a suitable finger-piece; a spring fulcrumed about said pivot, arranged with one end resting on said click or detent and having a coil therein beyond said click, with an extension arranged to engage said lug or finger on said adjusting-lever, for the purpose specified.

6. In a fishing-reel, the combination of a frame; a click-pinion; a lever having a click or detent thereon; a pivot on which said lever is mounted; an adjusting-lever having a finger arranged to engage the under side of said click-lever, mounted on the said pivot; means for holding said adjusting-lever outwardly, provided with a suitable finger-piece; a spring fulcrumed about said pivot, arranged with one end resting on said click or detent and having an extension arranged to engage said lug or finger on said adjusting-lever; for the purpose specified.

7. In a fishing-reel, the combination of a frame; a click-pinion; a lever having a click or detent thereon; a pivot on which said lever is mounted; an adjusting-lever arranged to engage said click-lever mounted on the said pivot; means for holding said adjusting-lever outwardly, provided with a suitable finger-piece; a spring for applying tension to said click-lever; means for adjusting the tension thereof; and a tension-spring for said adjusting-lever; for the purpose specified.

8. In a fishing-reel, the combination of a frame; a click-pinion; a lever having a click or detent thereon; a pivot on which said lever is mounted; an adjusting-lever arranged to engage said click-lever mounted on the said pivot; means for holding said adjusting-lever outwardly, provided with a suitable finger-piece; a spring for applying tension to said click-lever; means for adjusting the tension thereof; for the purpose specified.

9. In a fishing-reel, the combination of a frame; a click-pinion; a lever having a click or detent thereon; a pivot on which said lever is mounted; an adjusting-lever arranged to engage said click-lever mounted on the said pivot; means for holding said adjusting-lever outwardly, provided with a suitable finger-piece; a spring for applying tension to said click-lever; for the purpose specified.

10. In a fishing-reel, the combination of a frame; a click-pinion; a pivoted lever having a click or detent thereon; an adjusting-lever arranged to engage the said click-lever; means for holding said adjusting-lever outwardly; a spring arranged to apply tension to said click-lever, having an extension arranged to apply tension to said adjusting-lever; a cam having a notched or toothed periphery on which the said tension-spring rests for adjusting the tension thereof; a finger-piece for adjusting said cam; and a scale for said finger-piece, for the purpose specified.

11. In a fishing-reel, the combination of a frame; a click-pinion; a pivoted lever having a click or detent thereon; an adjusting-lever arranged to engage the said click-lever; means for holding said adjusting-lever outwardly; a spring arranged to apply tension to said click-lever, having an extension arranged to apply tension to said adjusting-lever; a cam having a notched or toothed periphery on which the said tension-spring rests for adjusting the tension thereof; for the purpose specified.

12. In a fishing-reel, the combination of a frame; a click-pinion; a pivoted lever having a click or detent thereon; an adjusting-lever arranged to engage the said click-lever; means for holding said adjusting-lever outwardly; a spring arranged to apply tension to said click-lever, having an extension arranged to apply tension to said adjusting-lever; a cam for adjusting the tension thereof; a finger-piece for adjusting said cam; and a scale for said finger-piece, for the purpose specified.

13. In a fishing-reel, the combination of a frame; a click-pinion; a pivoted lever having a click or detent thereon; an adjusting-lever arranged to engage the said click-lever; means for holding said adjusting-lever outwardly; a spring arranged to apply tension to said click-lever, having an extension arranged to apply tension to said adjusting-lever; a cam for adjusting the tension thereof; for the purpose specified.

14. In a fishing-reel, the combination of a frame; a click-pinion; a pivoted lever having a click or detent thereon; an adjusting-lever arranged to engage the said click-lever; means for holding said adjusting-lever outwardly; a spring arranged to apply tension to said click-lever, having an extension arranged to apply tension to said adjusting-lever; for the purpose specified.

15. In a fishing-reel, the combination of a frame; a click-pinion; a pivoted lever having a click or detent thereon; an adjusting-lever arranged to engage the said click-lever; means for holding said adjusting-lever outwardly; a spring arranged to apply tension to said click-lever; a cam having a notched or toothed periphery on which the said tension-spring rests for adjusting the tension thereof; a finger-piece for adjusting said cam; and a scale for said finger-piece, for the purpose specified.

16. In a fishing-reel, the combination of a frame; a click-pinion; a pivoted lever having a click or detent thereon; an adjusting-lever arranged to engage the said click-lever; means for holding said adjusting-lever outwardly; a spring arranged to apply tension to said click-lever; a cam having a notched or toothed periphery on which the said tension-spring rests for adjusting the tension thereof, for the purpose specified.

17. In a fishing-reel, the combination of a frame; a spool; a detent; means for holding said detent out of its engaging position; a spring arranged to apply tension to said detent; a member for adjusting the tension of said spring, having a notched or toothed periphery on which said spring rests; a finger-piece therefor; and a scale for said finger-piece, for the purpose specified.

18. In a fishing-reel, the combination of a frame; a spool; a detent; means for holding said detent out of its engaging position; a spring arranged to apply tension to said detent; a member for adjusting the tension of said spring; a finger-piece therefor; and a scale for said finger-piece, for the purpose specified.

19. In a fishing-reel, the combination of a frame; a spool; a detent; means for holding said detent out of its engaging position; a spring arranged to apply tension to said detent; and a cam for adjusting the tension of said spring, having a notched or toothed periphery on which said spring rests, for the purpose specified.

20. In a fishing-reel, the combination of a frame; a spool; a detent; means for holding said detent out of its engaging position; a spring arranged to apply tension to said detent; and a cam for adjusting the tension of said spring, for the purpose specified.

21. In a fishing-reel, the combination of a frame; a spool; a detent; a spring arranged to apply tension to said detent; a member for adjusting the tension of said spring, having a notched or toothed periphery on which said spring rests; a finger-piece therefor; and a scale for said finger-piece, for the purpose specified.

22. In a fishing-reel, the combination of a frame; a spool; a detent; a spring arranged to apply tension to said detent; a member for adjusting the tension of said spring; a finger-piece therefor; and a scale for said finger-piece, for the purpose specified.

23. In a fishing-reel, the combination with the frame, of a spool; a spring-arm secured at one end to said frame, having a slot therein and a friction-shoe on the free end thereof arranged to contact with said spool; a screw; a block threaded on said screw arranged in said slot in said spring-arm; a pinion on said screw having a hub journaled in said frame; a pinion meshing therewith arranged to project through the reel-frame for adjusting the same; and a finger-piece on the outer end of said screw, for the purpose specified.

24. In a fish-line reel, the combination with the frame, of a spool; a spring-arm secured at one end to said frame, having a slot therein and a friction-shoe on the free end thereof arranged to contact with said spool; a screw; a block threaded on said screw arranged in said slot in said spring-arm; and a finger-piece on the outer end of said screw, for the purpose specified.

25. In a fish-line reel, the combination with the frame, of a spool; a spring-arm secured at one end to said frame, having a slot therein and a friction-shoe on the free end thereof arranged to contact with the said spool; a screw; a block threaded on said screw arranged in said slot in said spring-arm; a pinion on said screw having a hub journaled in said frame; a pinion meshing therewith arranged to project through the reel-frame for adjusting the same for the purpose specified.

26. In a fish-line reel, the combination with the frame, of a spool; a spring-arm secured at one end to said frame, having a slot therein and a friction-shoe on the free end thereof arranged to contact with said spool; a screw for adjusting said arm; a pinion on said screw; a pinion meshing therewith arranged to project through the reel-frame for adjusting the same; and a finger-piece on the outer end of said screw, for the purpose specified.

27. In a fish-line reel, the combination with the frame, of a spool; a spring-arm secured at one end to said frame, having a slot therein and a friction-shoe on the free end thereof arranged to contact with said spool; a screw for adjusting said arm; and a finger-piece on the outer end of said screw, for the purpose specified.

28. In a fish-line reel, the combination with the frame, of a spool; a spring-arm secured at one end to said frame, having a slot therein and a friction-shoe on the free end thereof arranged to contact with said spool; a screw for adjusting said arm; a pinion on said screw; and a pinion meshing therewith arranged to project through the reel-frame for adjusting the same, for the purpose specified.

In witness whereof I have hereunto set my hand and seal in the presence of two witnesses.

WALTER E. MARHOFF. [L. S.]

Witnesses:
LULU G. GREENFIELD,
OTIS A. EARL.